June 14, 1938.  J. A. PERRY  2,120,294
HYDRAULIC BRAKE MECHANISM
Filed Aug. 28, 1936
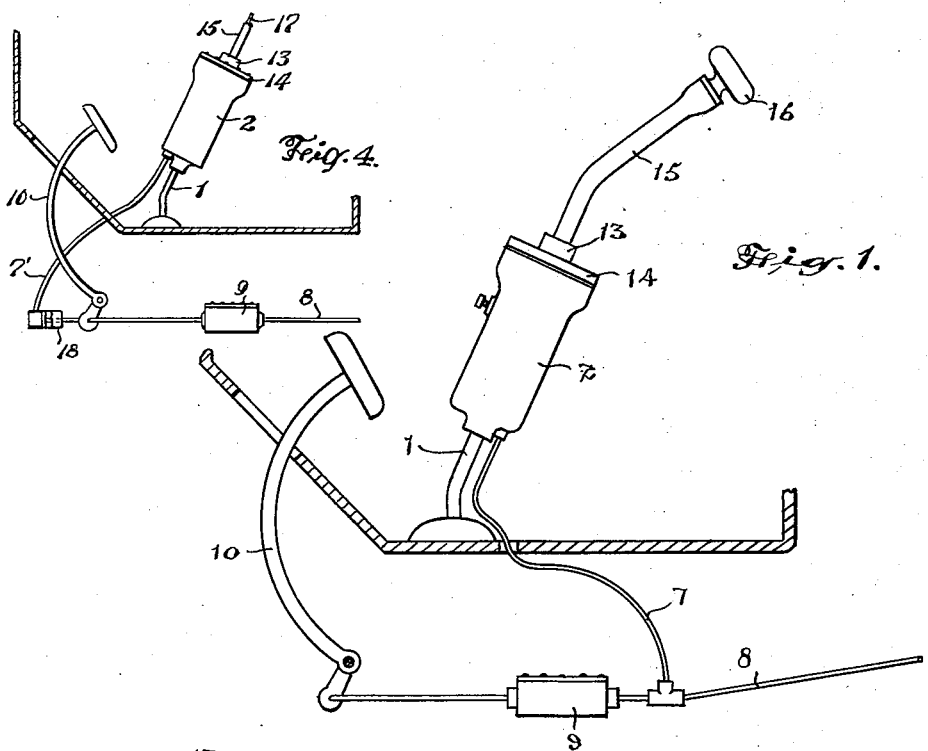
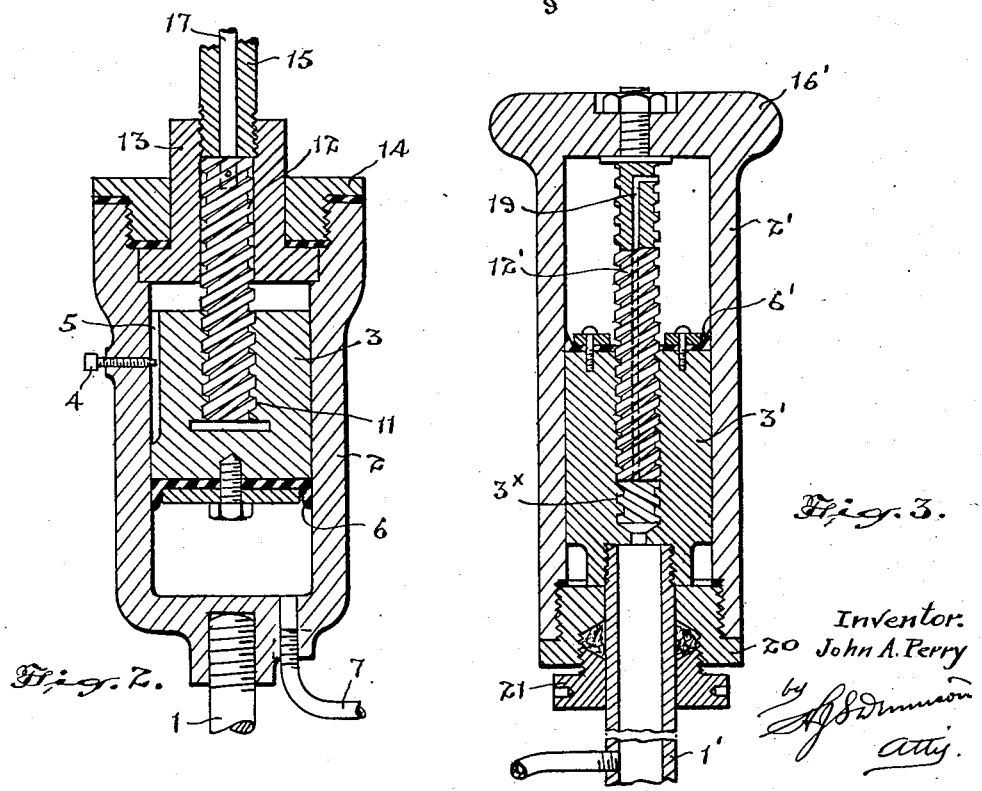
Inventor.
John A. Perry Patented June 14, 1938

2,120,294

UNITED STATES PATENT OFFICE 2,120,294

HYDRAULIC BRAKE MECHANISM

John A. Perry, Toronto, Ontario, Canada

Application August 28, 1936, Serial No. 98,311

12 Claims. (Cl. 192—4)

The principal objects of this invention are to provide an auxiliary brake-operating mechanism for motor cars which will greatly facilitate the operation of the vehicle by enabling the driver to maintain complete control of both accelerating and decelerating mechanisms and to provide a device which will permit the driver to retain constant foot control of his accelerator pedal in traffic while having the brake mechanism constantly under control of the hand.

A further and important object consists in the novel simplicity of the arrangement of a hydraulic piston mounted on the gear shift lever and capable of control by a twisting movement of the hand grasping such gear shift.

The principal feature of the invention consists in the novel arrangement of a hydraulic cylinder upon the gear shift lever of a motor car and a co-operating piston actuated to apply hydraulic pressure through the turning movement of spirally threaded co-acting members.

In the accompanying drawing, Figure 1 is a diagrammatic sectional view showing the arrangement of my device upon a gear shift lever of a motor car and co-operating with the ordinary pedal-operated hydraulic brake mechanism.

Figure 2 is an enlarged vertical sectional elevation of the preferred form of my hydraulic hand-operated brake control.

Figure 3 is an enlarged vertical section of a modified form of hand control device.

Figure 4 is a diagrammatic view illustrating a modified form of the invention.

In the ordinary operation of motor cars in traffic the operator is required to be continually shifting his right foot from the accelerator to the brake pedal and back and such operation is frequently the cause of minor accidents and this invention has been devised to obviate this condition and in the preferred form as illustrated in Figures 1 and 2 the gear shift lever 1 has mounted thereon a small hydraulic cylinder 2 which has operating therein a piston 3. This piston is movable longitudinally in the cylinder and is held from rotation by means of a suitable key, here shown in the form of a set screw 4 which extends into a longitudinal keyway or slot 5 in the piston.

The lower end of this piston is provided with an ordinary type of cupped washer 6 so that when the piston is forced downwardly it will force oil contained in the cylinder out through a suitable outlet pipe 7, which as shown in Figure 1, is connected to the conduit 8 of the ordinary hydraulic brake system, the connection being shown on the brake side of the ordinary hydraulic cylinder 9, the piston of which is operated by the foot lever 10.

The piston 3 is provided with a spirally-threaded axial orifice 11 in which is threaded a spiral spindle 12, the upper end of which is rotatably mounted in a cap 13 secured in the end of the cylinder by a lock nut 14.

A tubular rod 15 is secured in the upper end of the cap and forms the upper extension of the gear shift lever.

A knob or handle 16 is rotatably secured in the upper end of the handle member 15 and has connected thereto a flexible cable 17 which extends into an orifice in the upper end of the threaded spindle 12 and is rigidly secured thereto, so that upon the turning of the knob 16 a twisting action is applied to the cable which imparts the turning action to the threaded spindle and the rotation of the spindle, which is in spirally threaded engagement with the piston, forces the piston downwardly in the cylinder applying pressure to the oil contained in the lower end thereof which thus applies pressure to the braking system through the pipe 7.

It will be understood that a light braking pressure may be effected on the brakes of a car by a very slight application of twisting movement on the knob 16 so that the movement of the car may be checked or even completely stopped without the necessity of the driver removing his foot from the accelerator pedal, but of course if extra pressure is required for a quick stop the foot operation may be brought into use in the ordinary manner.

It may be found desirable to apply the hydraulic pressure generated in the cylinder 2 to operate the foot-controlled hydraulic piston 9 and if such a set-up is desired a suitable cylinder 18, shown in detail in Figure 4, may have its piston connected to the foot lever and it will be connected to the cylinder 2 by a pipe 7'.

The construction of the cylinder and its hydraulic plunger on the gear shift lever may be varied considerably within the scope of this invention and a modified form is illustrated in Figure 3 wherein the gear shift lever 1' is in the form of a tube and on the upper end of this is secured a piston 3' having a hydraulic washer 6' on the top thereof.

A cylinder 2' encircles the piston 3' and has a knob end 16' at the top to be grasped by the hand. This cylinder turns upon the piston and has rigidly secured axially thereof a spirally threaded spindle 12' which is threaded into the threaded orifice 3x in the piston.

The spindle 12' has a duct 19 extending axially therethrough and opening outwardly within the cylinder adjacent to the top, so that oil contained in the cylinder is forced through the duct 19 and through the hollow gear shift lever 1' which has a tube connected thereto at any suitable point to conduct the fluid pressure to the brake system in a suitable manner.

The cylinder 2' is closed at its lower end by a nut 20 and a suitable packing gland 21 is secured in this nut to maintain a fluid-tight joint around the exterior of the handle 1 as the cylinder moves up and down thereon. There is of course very little movement of the cylinder or piston of either form of this device required as the system is maintained full of oil and the required fluid pressure is produced with very little piston movement.

The device is extremely simple. It can be applied to any car and will undoubtedly greatly enhance the operation of the car in the manner herein described.

What I claim as my invention is:—

1. In a hydraulic brake mechanism, the combination with the hydraulically-operated brake and the gear shift lever, of a hydraulic chamber mounted on the gear shift lever and connected with the brake, and spirally threaded means conveniently rotatable from the upper end of the gear shift lever to create a hydraulic brake-applying pressure in said chamber.

2. In a hydraulic brake, the combination with the braking devices and the change gear lever, of a hydraulic cylinder axially mounted on said change gear lever and hydraulically connected with the aforesaid brake mechanism, a piston arranged in said hydraulic cylinder, a spirally threaded member operatively connecting said piston and said cylinder, and means rotatably carried by the gear shift lever and operatively connected with said spiral member to effect a relative longitudinal movement between said piston and cylinder to create a powerful hydraulic pressure within the gear shift lever cylinder to apply the brakes.

3. In a hydraulic brake mechanism, the combination with the change gear lever and hydraulic brakes, of a cylinder mounted on said lever, means connecting said cylinder with said hydraulic brakes, a piston operable in said cylinder, a threaded spindle operatively connected with said piston, and means on said change gear lever operatively connected with said spindle to rotate same and thereby operate said piston to create hydraulic brake-applying pressure in said lever-carried cylinder.

4. In a hydraulic brake, the combination with a gear shift lever, of a cylinder mounted thereon, a tubular handle rigidly secured to and extending upwardly from the cylinder, a flexible shaft mounted in said tubular handle, a knob secured to the upper end of said flexible shaft, a threaded spindle secured to the lower end of said flexible shaft, a piston threaded on said threaded spindle and slidably mounted in said cylinder, means for preventing rotation of the piston in said cylinder, and a flexible tube leading from said cylinder to the brake mechanism whereby fluid braking pressure will be directed thereto through the turning of said knob, shaft and spindle.

5. In a hydraulic brake mechanism, the combination with a gear shift lever, of a cylinder closed at one end and rigidly mounted upon the end of the gear shift lever, a flexible pipe connected with the closed end of said cylinder and leading to a hydraulic brake mechanism, a piston slidable and non-rotatable in said cylinder and having an axially spirally threaded orifice, a cap closing the open end of the cylinder, a threaded spindle rotatably mounted in said cap and extending into the threaded orifice of said piston, a rigid tubular extension secured in said cap, a knob rotatably mounted on the upper end of said tubular extension, and a flexible shaft connected to said knob and extending through said tubular extension and rigidly secured to said threaded spindle to operate said piston to apply hydraulic braking pressure through said flexible pipe to the brake device on the turning of said knob.

6. In a hydraulic brake mechanism for motor cars, the combination with the hydraulic brake system and the gear shift lever, of a fluid displacement chamber carried by the gear shift lever and having a fluid control connection with the hydraulic brake system of the car, and manually operable means rotatably carried by the gear shift lever for displacing fluid from said chamber to the hydraulic brake system of the car to conveniently apply the brakes.

7. In a hydraulic mechanism for motor cars, the combination with the hydraulic brake system and the gear shift lever, of a cylinder rotatably mounted on said lever, a fluid displacement piston slidably and rotatably encircled by said cylinder and rigidly connected with the gear shift lever, said cylinder having its interior connected with the hydraulic brake system, and means forming a threaded operative connection between said piston and cylinder to create brake-applying pressure in said cylinder on the manual rotating of the same.

8. Means as claimed in claim 7 in which said last-mentioned means comprises a threaded spindle rigidly secured to the cylinder and extending axially interiorly thereof into co-operative threaded engagement with the piston.

9. Means as claimed in claim 7 in which the upper end of said cylinder is closed and provided with an operating hand grip for rotating same and the lower end thereof extends beyond the piston and is rotatably sealed about the gear shift lever.

10. In a hydraulic mechanism for motor cars, the combination with the hydraulic brake system, of a hollow gear shift lever having its interior connected with the hydraulic brake system, a piston member fixed to the upper end thereof having a central threaded passage communicating with the interior thereof, a threaded spindle threaded into said piston passage, a cylinder rotatable about said piston and forming therewith a fluid displacement chamber, and means forming a fluid connection between the interior of said cylinder above the piston therein and the interior of the gear shift lever therebelow.

11. Means as claimed in claim 10 in which said threaded spindle has a passage leading upwardly from the lower end in constant communication with the interior of the gear shift lever through the threaded piston passage and the upper end of the spindle passage opens into the upper end of the cylinder interior.

12. In a hydraulic brake mechanism for motor cars including a master hydraulic cylinder directly operable by the foot brake pedal, the combination of a gear shift lever, fluid-displacement means carried by the gear shift lever including a control member rotatable on the gear shift lever, and a secondary control cylinder connected with said fluid displacement means and having a plunger operatively associated with the piston of the master cylinder to operate same independent of foot pressure on the foot brake pedal.

JOHN A. PERRY.